United States Patent [19]
Filion et al.

[11] Patent Number: 5,448,028
[45] Date of Patent: Sep. 5, 1995

[54] ARMREST ELECTRICAL SWITCH ARRANGEMENT WITH SOFT INTERIOR TRIM PANEL

[75] Inventors: Scott M. Filion, Newmarket; John A. Grimes, Dover; Marie J. Hersman, Durham; Maureen M. Lein, Chester, all of N.H.

[73] Assignee: Davidson Textron, Inc., Dover, N.H.

[21] Appl. No.: 165,358

[22] Filed: Dec. 10, 1993

[51] Int. Cl.⁶ ............................ H01H 9/00; A47C 7/54
[52] U.S. Cl. ........................... 200/52 R; 200/5 R; 200/302.1; 200/308; 296/153; 297/411.21
[58] Field of Search ............... 200/5 R, 5 A, 86 R, 200/308-317, 302.1-302.3, 512-517; 296/153; 297/411.21, 411.2

[56] References Cited

U.S. PATENT DOCUMENTS

| | | | |
|---|---|---|---|
| 3,629,380 | 12/1971 | Edwards | 264/53 |
| 3,860,771 | 1/1975 | Lynn et al. | 200/5 A |
| 4,090,045 | 5/1978 | Marsh | 200/5 A |
| 4,218,600 | 8/1980 | Kissner | 200/5 A X |
| 4,308,439 | 12/1981 | Itoh | 200/5 E X |
| 4,314,116 | 2/1982 | Gordon | 200/5 A |
| 4,317,012 | 2/1982 | Itoh | 200/5 A |
| 4,439,647 | 3/1984 | Calandrello et al. | 200/5 A |
| 4,473,724 | 9/1984 | Suzuki | 200/5 R |
| 4,575,117 | 3/1986 | Uchida | 280/750 |
| 4,612,425 | 9/1986 | Kanai et al. | 200/61.55 |
| 4,736,077 | 4/1988 | Valente | 200/84 C |
| 4,742,192 | 5/1988 | Levine et al. | 200/61.57 |
| 4,818,827 | 4/1989 | Ipcinski et al. | 200/5 A |
| 4,882,460 | 11/1989 | Mertens | 200/512 |
| 4,892,988 | 1/1990 | Ishii | 200/516 |
| 4,934,735 | 6/1990 | Embach | 200/5 A |
| 4,963,705 | 10/1990 | Broderick et al. | 200/86 R |
| 5,001,308 | 3/1991 | Mori | 200/5 A |
| 5,062,661 | 11/1991 | Winget | 280/731 |
| 5,085,462 | 2/1992 | Gualtier | 280/731 |
| 5,286,078 | 2/1994 | Mottino et al. | 296/153 |

*Primary Examiner*—J. R. Scott
*Attorney, Agent, or Firm*—Reising, Ethington, Barnard and Perry

[57] ABSTRACT

The soft interior trim panel (52) includes a substrate (54), a foam layer (56) and a flexible skin (58). An electrical switch (60) is supported by the trim panel (52) adjacent to the flexible skin (58). A contoured area (62) and indicia (64) indicate the location of a switch (60) under the flexible skin (58). A clear coat (65) is applied to protect the flexible skin (58) and the indicia (64). The switch (60) is closed by applying pressure to the flexible skin (58) on the contoured area (62). The contoured area (62) can be a depression or indentation as well as a raised area. The indicia (64) can be provided using luminescent ink.

11 Claims, 2 Drawing Sheets

ARMREST ELECTRICAL SWITCH ARRANGEMENT WITH SOFT INTERIOR TRIM PANEL

TECHNICAL FIELD

The soft interior trim panel and electrical switch is for use in a vehicle. The panel may be part of a door, a dash, an overhead console, a headliner or a console at the side of a seat.

BACKGROUND OF THE INVENTION

Soft interior trim panels are currently used for vehicle interiors. These panels generally have an outer cover of leather, a plastic material that is similar to leather or a fabric material. A foam material on the back side of the outer cover provides softness. A substrate is employed on the back side of the foam to support the foam and the outer cover and for mounting the soft interior trim panel in a vehicle.

Electrical switches that are currently used extend through an aperture through a bezel that passes through an aperture through a trim panel. Such electrical switches may be either secured to the bezel or they can be attached to the same structure that the trim panel is attached to. These electrical switches and bezels are hard and rigid. The bezels and switches may catch on clothing and cleaning materials. The switches are difficult or impossible to clean, allow the passage of air and may transfer heat into or out of a vehicle passenger compartment. Such switches occasionally become either too hot or too cold to be activated without the person activating the switches wearing gloves.

Electrical Switch and bezel fit is a serious problem. The bezel for mounting an electrical switch is frequently loosely received in an aperture through a trim panel. This allows movement between the bezel and the panel and unsightly wear and scuffing of the trim panel. If the electrical switch is mounted on the same member that the trim panel is attached to, the switch or switches determine the location of the trim panel relative to the member upon which the trim panel is mounted. It is difficult to accurately locate apertures through trim panels relative to other attaching members for attaching a trim panel to a vehicle.

SUMMARY OF THE INVENTION

An object of the invention is to provide switches in a trim panel that are covered by a soft flexible skin material.

Another object of the invention is to provide electrical switches that are attached to a trim panel with a soft flexible skin without apertures through the flexible skin for the passage of a portion of the switches.

A further object of the invention is to provide a trim panel with a contoured soft flexible skin that indicates the location of a switch under the soft flexible skin.

A still further object of the invention is to place indicia on the soft flexible skin of a soft trim panel that indicates the location of an electrical switch.

The soft interior trim panel includes a substrate, a foam layer bonded to the substrate and a flexible skin bonded to the foam. An electrical switch is mounted on the soft interior trim panel on the back side of the flexible skin. The electrical switch may be encased within the foam layer and held in position by the foam. The electrical switch may also be attached to and held in place by the substrate.

The location of an area on the flexible skin where pressure is to be applied to activate an electrical switch is indicated by the contour of the flexible skin, or by indicia printed on the flexible skin or by both the contour and indicia. The contour may include a raised area adjacent to an electrical switch. The contour may also include a depressed or indented area. The raised area or the depressed area can be found by a person's fingers without visual reference. Indicia can be provided to identify an electrical switch and to indicate the area of the flexible skin where pressure is to be applied to activate an electrical switch. Indicia is applied by a printing process with ink. Luminescent ink may be used so that it can be seen at night. A film can be sprayed on the flexible skin and the ink to protect the flexible skin and the ink.

An electrical switch is mounted adjacent to an area of the flexible skin which is to be pressed to activate the switch. The electrical switch may be encapsuled by the flexible skin and the foam layer or it can be fully encapsuled within the foam layer. The electrical switch can also be attached to the substrate and extend at lease part way through the foam layer.

The foregoing and other objects, features and advantages of the soft interior trim panel and electrical switch will become apparent in view of the detailed description and the drawing described therein.

DESCRIPTION OF THE PREFERRED EMBODIMENT

Figure 1:
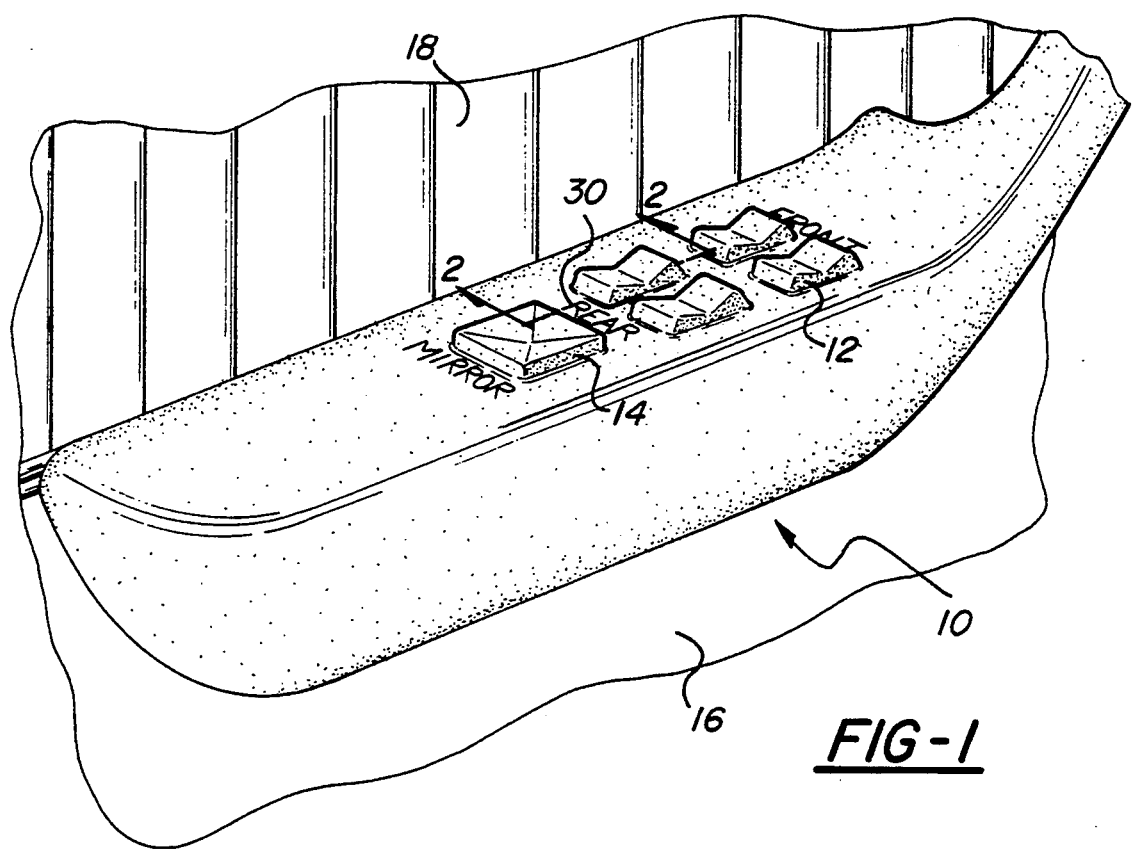
FIG. 1 is a perspective view of a portion of the inside of a vehicle door with a soft interior trim panel with electrical switches for opening and closing windows and for adjusting an outside rear view mirror.

A soft interior trim panel with multiple electrical switches is shown in FIG. 1 as an arm rest 10 for a vehicle door with four switches at areas 12 for opening and closing windows and switches at an area 14 for adjusting an outside rear view mirror. The arm rest 10 is shown as a separate member from the vertical door panels 16 and 18. The arm rest 10 and the vertical door panels 16 and 18 could be one integral soft interior trim panel if desired. Soft interior trim panels and electrical switches can be employed on any interior surface of a vehicle. They can be part of the dash and instrument panel, part of a headliner and overhead console, part of a seat, part of a center console between seats or any other part of a vehicle interior.

Figure 2:
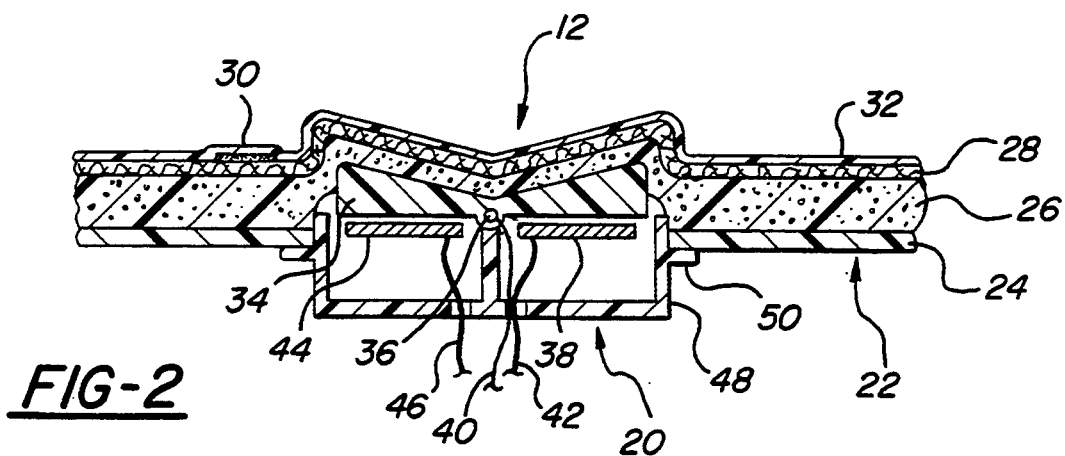
FIG. 2 is a cross sectional view of a soft interior trim panel and a contact type rocker switch taken along line 2—2 in FIG. 1.

A cross sectional view of a portion of the arm rest 10 and the electrical switch 20 for the left rear window of a vehicle is shown in FIG. 2. The soft interior trim panel 22 includes a substrate 24, a foam layer 26 and a flexible skin 28. The substrate 24 is normally a relatively stiff thermoplastic material that is shaped and contoured to fit in the portion of a vehicle interior in which a panel is to be used. The flexible skin 28 can be made from a number of different materials. A material that works well for the flexible skin 28 is poly vinyl chloride (PVC). Other materials that have been used include thermoplastic urethane (TPU), thermoplastic olefin (TPO), polyesters, and leather. The foam layer 26 is generally formed and cured in a mold between the substrate 24 and the flexible skin 28. Heat supplied in the mold bonds the foam layer 26 to both the substrate 24 and the flexible skin 28. The outer surface of the flexible skin 28 may have a surface texture which simulates leather when the flexible skin 28 is PVC or some other plastic. Other surface textures can be provided if desired.

An electrical switch 20 is supported adjacent to the back side of the flexible skin 28. Different types of switches 20 can be used. The electrical switch 20 can not be seen by a vehicle operator or passenger because it is on the back side of the flexible skin 28. It is therefore necessary to configure an area of the flexible skin 28 to indicate where a person should press on the flexible skin to activate the electrical switch 20. The area can be configured to indicate where to apply pressure by providing a special contour, by providing indicia or by providing a special contour and indicia. The area 12 of the flexible skin 28 is raised up from the general plane of the flexible skin to indicate the position of the electrical switch 20, as shown in FIGS. 1 and 2. The raised area 12 of the flexible skin 28 can be found and identified by feel and location without visually looking at the soft interior trim panel.

Switches in vehicles are normally provided with indicia which identify the switch visually. Visual identification can be provided by printing words or symbols directly on the surface of the flexible skin 28. There are commercially available inks which can be used to print letters or symbols on the flexible skin 28. The ink which works best depends upon the specific material from which the flexible skin 28 is made. Luminescent ink can be employed if desired. When luminescent ink is used, it may be necessary to provide a light source to supply the light that is reflected by the luminescent ink. Indicia 30 on the flexible skin 28 is shown in FIGS. 1 and 2. The thickness of the indicia 30 is exaggerated in FIG. 2 for purposes of illustration. Most inks provide a very thin layer on the surface of the flexible skin 28 and are in some cases partially absorbed by the flexible skin. A clear coat 32 is applied to the outer surface of the flexible skin 28 to protect the flexible skin and the indicia 30 from wear and abrasion. The clear coat 32 also protects the indicia from chipping if an ink is used which can chip. The clear coat 32 used with a PVC flexible skin 28 is a thin film of urethane. The material used for the clear coat 32 may be changed to be compatible with the material used for the flexible skin 28 and the ink used for the indicia 30.

The switch 20, shown in FIG. 2, is a contact type rocker switch with three positions. The rocker member 34 can be pivoted about the post 36 by pressing on and deforming the area 12 of the flexible skin 28. Pivoting the rocker member 34 about the post 36, from the off position shown in FIG. 2, into contact with the contact bar 38 will connect the wire 40 to the wire 42 and close one circuit to raise a window. Pivoting the rocker member 34 about the post 36 into contact with the contact bar 44 will connect the wire 40 to the wire 46 and close a circuit to lower a window. The switch 20 includes a housing member 48 that extends through an aperture in the substrate 24. The housing member 48 includes an external flange 50 which is connected to the substrate 24. The flange 50 can be attached to the substrate 25 by mechanical fasteners (not shown), by adhesives or by other known attaching systems. With this construction the electrical switch 20 can be attached to the soft interior trim panel 22 after the trim panel is completely formed. It would also be possible to replace a defective electrical switch 20. A portion of the foam layer 26 that is between the flexible skin 28 and the electrical switch 20 provides a soft feel for the switch.

Figure 3:
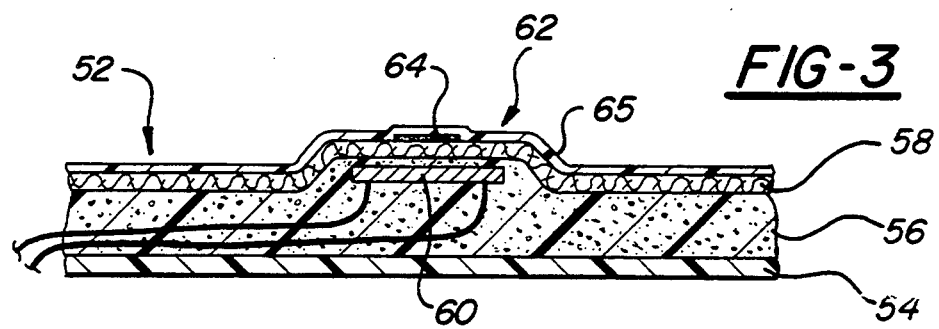
FIG. 3 is a cross sectional view of a soft interior trim panel and a flexible membrane type switch.

A soft interior trim panel 52 is shown in FIG. 3. This soft interior trim panel 52 includes a substrate 54, a foam layer 56 and a flexible skin 58. A membrane switch 60 is encapsuled in the foam layer 56. The thin portion of the foam layer 56 between the membrane switch 60 and the flexible skin 58 provides a soft feel for the switch. The flexible skin 58 is raised up from the general plane of the flexible skin 58 in an area 62 so that the membrane switch 60 can be located by feel. Indicia 64 is printed on the flexible skin 58 and a clear coat 65 is applied to protect the flexible skin 58 and the indicia 64. The application of sufficient pressure on the flexible skin 58 on the area 62 will connect a wire 66 to a wire 68 and close a circuit. The soft interior trim panel 52 is substantially identical to the soft interior trim panel 22 except for the membrane switch 60. The membrane switch 60 is positioned inside the soft interior trim panel 52 and fixed in its position during forming and curing of the foam layer 56. The membrane switch 60 is not considered to be replaceable without replacing the soft interior trim panel 52.

Figure 4:
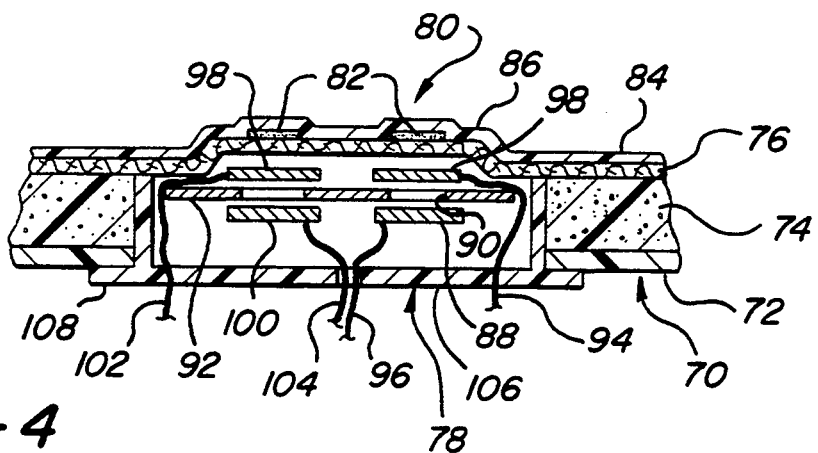
FIG. 4 is a cross sectional view of a soft interior trim panel and a double electrical switch module that is installed following foaming.

A soft interior trim panel 70, shown in FIG. 4, includes a substrate 72, a foam layer 74 and a flexible skin 76. A double switch 78 is inserted through an aperture through the substrate 72 and the foam layer 74 after the soft interior trim panel 70 is formed and the foam layer is cured. The flexible skin 76 is raised up from the general plane of the flexible skin 76 in an area 80 so that the double switch 78 can be located by feel. Indicia 82 are printed on the flexible skin 76 in two places on the surface of the area 80. A clear coat 84 is applied to protect the flexible skin 76 and the indicia 82. The application of sufficient pressure on the area 80 above the contact plate 86 will deflect the contact plate through apertures 90 in the separator sheet 92 and into contact with the terminal bar 88, thereby connecting a wire 94 to a wire 96 to close a circuit. The application of sufficient pressure on the area 80 above the contact plate 98 will deflect the contact plate through apertures 90 in the separator sheet 92 and into contact with the terminal bar 100 thereby connecting a wire 102 to a wire 104 to close a circuit. The double switch 78 includes a housing 106 with a flange 108. The housing 106 is inserted into an aperture through the substrate 72 and the foam layer 76 until the flange 108 contacts the substrate. The housing 106 is secured to the substrate by fasteners or by adhesives. The double switch 78 is attached to the soft interior trim panel 70 after the foam layer 74 is formed and cured. Replacement of the double switch 78 is possible without damaging the soft interior trim panel 70 if replacement is necessary. A foam layer is not provided between the double switch 78 and the flexible skin 76 but could be inserted if required.

Figure 5:
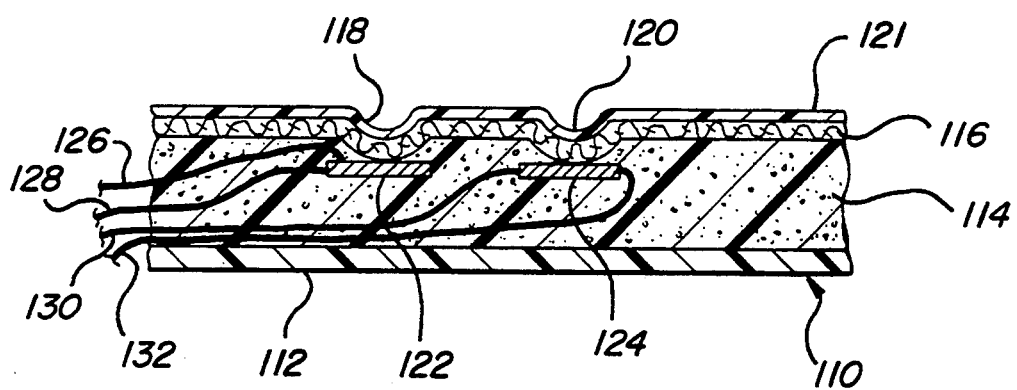
FIG. 5 is a cross sectional view of a soft interior trim panel, two flexible membrane type switches and finger indentions or depressions.

A soft interior trim panel 110 including a substrate 112 a foam layer 114 and a flexible skin 116 is shown in FIG. 5. The flexible skin 116 includes indented or depressed areas 118 and 120. The depressed areas 118 and 120 are preferably shaped and oriented to receive the tip portion of a person's finger. A printed indicia is not shown on the outer surface of the flexible skin 116 but could be applied as explained below if desired. Such indicia, if used, could be in the depressed areas 118 and 120 or at the side of the depressions. A clear coat 121 is applied to the outer surface of the flexible skin 116 to protect the flexible skin and to protect indicia in the event indicia is applied to the flexible skin. A membrane switch 122 is encapsuled in the foam layer 114 adjacent to the depressed area 118. Another membrane switch 124 is encapsuled in the foam layer 114 adjacent to the depressed area 120. Both membrane switches 122 and 124 are positioned inside the soft interior trim panel 110 and fixed in position during foaming and curing of the foam layer 114. The application of pressure with a finger in the depressed area 118 will close the membrane switch 122 and connect the wire 126 to the wire 128. The application of pressure with a finger in the depressed area 120 will close the membrane switch 124 and connect the wire 130 to the wire 132.

Figure 6:
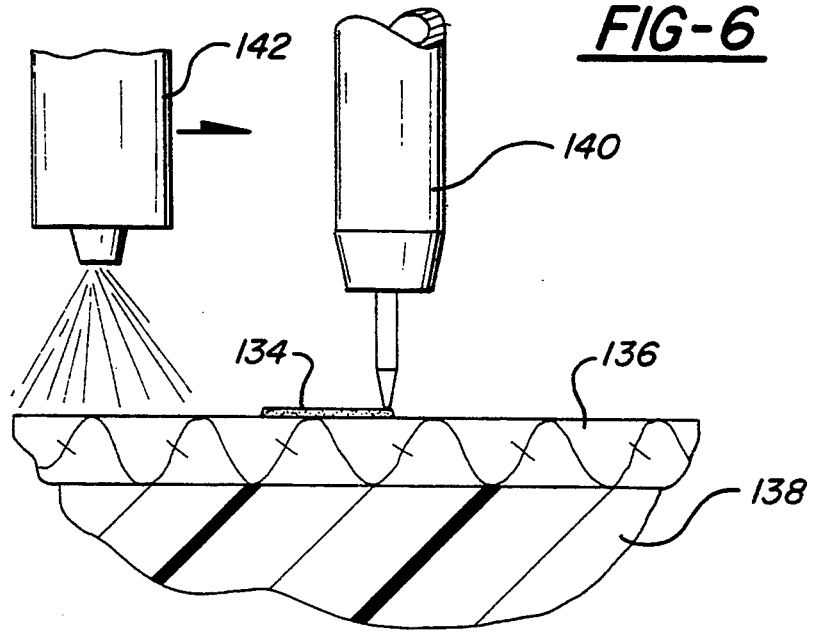
FIG. 6 is a cross sectional view of a portion of a soft interior trim panel showing the process for pad printing and the application of a clear coat.

A pad printing system is illustrated in FIG. 6. The system includes the application of ink to the outer surface of a flexible skin 136 to form indicia 134. The flexible skin 136 is bonded to a foam layer 138 on its inside surface. Ink is applied to form the indicia 134 by a suitable ink applicator 140. The ink could also be applied by a silk screen process, a roller or other suitable procedures. After the indicia 134 is applied to the outer surface of a flexible skin 136 of a soft interior trim panel, a thin durable film of a coating material compatible with the material used for the flexible skin is sprayed over the surface of the flexible skin 136 and the indicia 134 by a coating spray applicator 142. The coating dries to form a thin, durable and transparent film that protects the flexible skin 136.

The raised areas 12, 62 and 80 and the indented or depressed areas 118 and 120 may be formed in the flexible skin in a mold during the formation of a foam layer between the flexible skin and a substrate. The raised areas 12, 62 and 80 or the depressed areas 118 and 120 can also be formed in the flexible skin before the flexible skin becomes part of a soft interior trim panel.

A flexible skin made from PVC generally has sufficient elasticity to be manually deformed to activate a switch and return to its original shape for a large number of cycles over a period of years. However, in cold weather PVC tends to become stiff or rigid. If required an insert of silicone or rubber could be formed and joined with the flexible skin adjacent to electrical switches to provide improved flexibility in cold weather.

The soft interior trim panel of this invention has been described above in combination with various electrical switches. The employment of raised areas and indented areas as well as printed indicia to indicate the location of switches has also been described above. Various other modifications and variations have been suggested in the written description. All such modifications and variations are within the scope of the invention as determined by the appended claims when interpreted in accordance with the breadth to which they are fairly legally and equitable entitled.

We claim:

1. A vehicle soft interior trim panel comprising:
   a substrate;
   a foam layer bonded directly to the substrate;
   a flexible skin with an underside surface bonded directly to the foam layer and an outside face surface;
   a pressure actuated modular switch with a base portion secured to the substrate and an outer portion positioned between the substrate and the underside surface of the flexible skin and having at least a portion of the foam layer between the pressure actuated modular switch and the underside surface of the flexible skin;
   a depressed area in said flexible skin adjacent to the outer portion of the pressure actuated switch for guiding a person's finger tip to a location where manual compression of the flexible skin and the foam layer between the pressure actuated modular switch and the flexible skin will depress the flexible skin and activate the modular switch; and
   wherein release of manual compression force on the flexible skin will allow the flexible skin to return to its non-compressed contour with the depressed area.

2. A vehicle soft interior trim panel as set forth in claim 1 including an indicia printed on the outside face surface of the flexible skin for indicating the function of said pressure actuated modular switch.

3. A vehicle soft interior trim panel as set forth in claim 2 including a protective coating applied to the outside face surface of the flexible skin and to the indicia as a liquid and then dried to form a thin durable transparent protective film.

4. A vehicle soft interior trim panel comprising:
   a substrate;
   a foam layer bonded directly to the substrate;
   a flexible skin with an underside surface bonded directly to the foam layer and an outside face surface;
   a pressure actuated modular switch with a base portion secured to the substrate and an outer portion positioned between the substrate and the underside surface of the flexible skin and having at least a portion of the foam layer between the pressure actuated modular switch and the underside surface of the flexible skin;
   a raised area on said flexible skin adjacent to the outer portion of the pressure actuated switch, in which the outside face surface of the raised area is positioned outwardly from adjacent parts of the flexible skin, for guiding a person's finger tip to a location where manual compression of the flexible skin and the foam layer between the pressure actuated modular switch and the flexible skin will depress the flexible skin and activate the modular switch; and
   wherein release of manual compression force on the flexible skin will allow the flexible skin to return to its non-compressed contour with the raised area.

5. A vehicle soft interior trim panel as set forth in claim 4 including indicia printed on the outside face surface of the flexible skin for indicating the function of said pressure actuated modular switch.

6. A vehicle soft interior trim panel as set forth in claim 5 including a protective coating applied to the outside face surface of the flexible skin and to the indicia as a liquid and then dried to form a thin durable transparent protective film.

7. A vehicle soft interior trim panel comprising:
a substrate;
a foam layer bonded directly to the substrate;
a flexible skin with an underside surface bonded directly to the foam layer and an outside face surface;
a pressure actuated modular switch with a base portion secured to the substrate and an outer portion positioned between the substrate and the underside surface of the flexible skin and having at least a portion of the foam layer between the pressure actuated modular switch and the underside surface of the flexible skin; and
an indicia printed on the outside face surface of the flexible skin for indicating the function of said pressure actuated modular switch and for indicating where manual compression of the flexible skin and the foam layer between the pressure actuated modular switch and the flexible skin will depress the flexible skin and activate the modular switch; and wherein release of manual compression force on the flexible skin will allow the flexible skin to return to its non-compressed contour.

8. A vehicle soft interior trim panel as set forth in claim 7 including a protective coating applied to the outside face surface of the flexible skin and to the indicia as a liquid and then dried to form a thin durable transparent protective film.

9. A vehicle soft interior trim panel as set forth in claim 7 including a thin durable transparent protective film that covers and adheres to the outside face surface of the flexible skin and the indicia printed on the outside surface of the flexible skin.

10. A vehicle soft interior trim panel comprising:
a substrate;
a foam layer bonded directly to the substrate;
a flexible skin with an underside surface bonded directly to the foam layer and an outside face surface;
a pressure actuated modular membrane switch incased in the foam layer between the substrate and the underside surface of the flexible skin and having at least a portion of the foam layer between the pressure actuated modular switch and the underside surface of the flexible skin; and
an indicia printed on the outside surface of the flexible skin for indicating the location of said pressure actuated modular membrane switch.

11. A vehicle soft interior trim panel as set forth in claim 10 including a thin durable transparent protective film that covers and adheres to the outside face surface of the flexible skin and the indicia printed on the outside surface of the flexible skin.

* * * * *